Aug. 31, 1954     M. W. HUBER     2,687,743

PRESSURE REDUCING VALVE WITH OVER-PRESSURE RELEASE

Filed May 17, 1950

Inventor
Matthew W. Huber
By Dodge and Dona
Attorneys

Patented Aug. 31, 1954

2,687,743

UNITED STATES PATENT OFFICE 2,687,743

PRESSURE REDUCING VALVE WITH OVER-PRESSURE RELEASE

Matthew W. Huber, Watertown, N. Y., assignor to The New York Air Brake Company, a corporation of New Jersey Application May 17, 1950, Serial No. 162,544

6 Claims. (Cl. 137—116.5)

This invention relates to fluid pressure control valves and provides a combined pressure reducing and pressure relief valve intended for use in hydraulic systems.

The hydraulic pressure systems on airplanes commonly are operated at pressures undesirably high for use in the brakes. There is a demand for a pressure reducing valve capable of deriving liquid at a pressure of say 500 or perhaps 800 p. s. i. from a line operated at say 1500 or 3000 p. s. i. The problem seemed simple until it was observed that heating of the hydraulic liquid in the wheel brake motors during brake applications tends to cause expansion of the liquid, and consequent development of over-pressures which could not be relieved through conventional reducing valves.

The present invention permits the incorporation of a relief valve in the pressure reducing valve structure, and does so in such a way that a single loading spring and a single spring-adjusting mechanism serve both valves. This reduces weight, simplifies adjustment and maintenance and gives better control. An important characteristic is that the valve is indifferent to variations of the higher pressure so long as this is above the lower pressure for which the reducing valve is set.

For a clear understanding of the invention, reference should be made to the accompanying drawing, in which.

Figure 1:
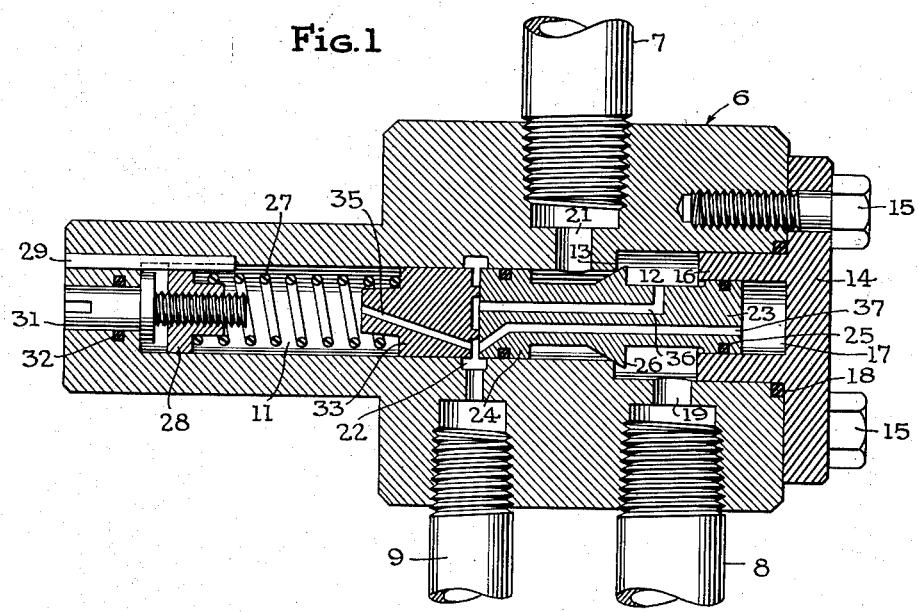
Fig. 1 is an axial section of the complete valve mechanism. The drawing is diagrammatic to the extent that all ports are shown in the plane of section, a possible but not a necessary arrangement.

The valve body or housing is generally indicated by the numeral 6. To this three pipe lines are connected, line 7 being the high-pressure line or main supply line leading from any appropriate source of high-pressure liquid, line 8 being the low-pressure line (which in a brake system would supply the brakes), and 9 being a drain line which could and commonly would be connected with the liquid supply sump of the hydraulic system.

Formed in the body 6 are two coaxial bores, a smaller bore 11, a part of which serves as a cylinder for the larger piston head of the differential piston valve, hereinafter described, and a larger bore 12 which serves in part as a valve chamber. The shoulder 13 affords a sharp annular edge which serves as a valve seat of negligible area.

A cap 14 held by machine screws 15 has a tubular extension 16 which fits in the outer end of bore 12 and affords a cylinder 17 for the smaller piston head of the differential piston valve. A toric gasket 18 of rubber-like material seals the joint between the parts 6 and 14.

A port 19 leads from connection 8 to the valve chamber portion of bore 12. A port 21 leads from connection 7 to the cylinder portion of bore 11. It enters the bore near shoulder 13 and in all positions of the differential piston valve communicates with the space between the larger piston head and the valve cone. An annular groove port 22 encircling bore 11 connects with line 9. It is partially lapped by the larger piston head of the differential piston valve when the valve is closed.

The differential piston valve comprises a relatively small piston head 23 which works in cylinder 17 and a relatively large piston head 24 which works in bore 11. The piston heads are connected by a stem, smaller than the smaller piston head. The stem carries the conical valve head 26, which when closed has a line contact with the annular seat which is the inner margin of shoulder 13. The two piston heads and the valve cone are coaxial. The valve is illustrated in its closed position.

The piston heads are each sealed by an O-ring clearly indicated in the drawing. That which seals piston head 23 is identified by the reference numeral 25. The ring on head 24 is similarly illustrated and since it is readily identifiable, no reference numeral is needed.

A coil compression spring 27 is sustained at its outer end by a seat 28. This is held against rotation by spline 29 and is adjustable to vary the stress on the spring by turning the screw stem 31 which is swiveled in the body 6 and threaded into the seat 28. An O-ring 32 affords a seal.

Figure 2:
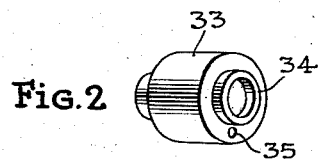
Fig. 2 is a perspective view of the combined thrust plunger and relief valve.

The spring 27 reacts on a combined thrust plunger and relief valve 33 which fits and is slidable in bore 11. Its form is clearly shown in Fig. 2. A boss centers the end of spring 27. On the opposite end of member 33 is a rib or seat 34 which normally seals against the end of piston head 24. A drilled passage 35 leads from the space outside the rib 34 to the bore 11 behind member 33, and since this outside space always communicates with drain line 9, the spring space in bore 11 is always at drain line pressure. A port 37 drilled from end to end through the differential piston valve maintains the same pressure condition in cylinder 17.

A port 36 formed in the differential piston valve always communicates at one end (the right-hand end in Fig. 1) with port 19. At its other end it terminates on the end of piston 24 within the area encircled by rib or seat 34.

The effective area so encircled is important. The relief action should start at a pressure only moderately above that which the reducing valve is set to establish. The pressure in port 19 is effective in a direction to close valve 26 on the differential of area between piston heads 24 and 23. It acts simultaneously on the effective area within rib or seat 34. It should seat valve 26 before it unseats 34. The spread between these valves can be determined by selection of the diameter of rim 34.

The construction has the advantage that adjustment of one spring sets the control point of the reducing valve and the related control point of the relief valve. Aside from the obvious manipulative advantage, weight is reduced, precision of action is favored since neither the piston valve or the member 33 remains static for long, and the pressure relation between pressure reduction and pressure relief is stabilized even during adjustment of both.

The valve operates as follows: When valve cone 26 is seated, the valve is indifferent to supply pressure because the annular exposed areas of piston 24 and valve 26 are equal. At this time the valve is biased closed by derived pressure in bore 12 because the seated area of valve 26 exceeds the annular area of piston 23 exposed to pressure in chamber 12.

When the valve is open, the seating pressure effect is the same as when the valve is closed but will be expressed as derived pressure acting on the area differential between pistons 23 and 24. The seated area of 26 being the same as the area of 24, the opening and closing of the valve has no pressure effect but there doubtless are disturbances caused by flow when the valve is open.

In any event, the spring 27 urges the valve in an opening direction, and the force reaction is delivered through rim 34. If the effective area within rim 34 is properly chosen, valve 26 must seat before member 33 will move away from piston 24 and relieve over-pressure in port 19. At such time pressure in 19 holds valve 26 closed.

Other specifically different arrangements to cause one spring and one spring-adjusting means to affect both the reducing valve and the relief valve are possible.

I claim:

1. In a pressure reducing valve the combination of a housing enclosing two coaxial cylinder bores of unequal diameters, and an intervening chamber whose transverse dimensions exceed the diameter of the larger bore, the junction of the larger bore with said chamber affording an annular valve seat, there being an outlet connection for reduced pressure fluid leading from said chamber and an inlet connection leading to the larger bore, so that communication between said connections is through said valve seat; a differential piston element having spaced heads working in respective bores and connected by a stem smaller in diameter than the larger bore and extending through the valve seat, said stem carrying between the heads a valve adapted to close against said seat whereby, in all positions of said valve, pressure in said chamber reacts on said piston element in the valve-closing direction upon an effective area equal to the difference of transverse area of said two bores; and yielding means urging said differential piston in its valve-opening direction.

2. In a pressure reducing valve the combination of a housing enclosing two coaxial cylinder bores of unequal diameters, and an intervening chamber whose transverse dimensions exceed the diameter of the larger bore, the junction of the larger bore with said chamber affording an annular valve seat, there being an outlet connection for reduced pressure fluid leading from said chamber and an inlet connection leading to the larger bore, so that communication between said connections is through said valve seat; a differential piston element having spaced heads working in respective bores and connected by a stem smaller in diameter than the larger bore and extending through the valve seat, said stem carrying between the heads a valve adapted to close against said seat whereby pressure in said chamber urges the differential piston element in the valve-closing direction, said differential piston element having a vent passage connecting said chamber with the outer end of its larger piston head; a plunger guided in the larger bore, said plunger and the outer end of the larger piston being so formed as to engage and seal on a seat rim surrounding the end of the vent passage, the area enclosed by said seat rim being less than the effective differential area of the pistons; means affording a vent from space surrounding said seat rim; and yielding means urging said plunger toward said differential piston and serving to bias the latter in its valve-opening direction.

3. The combination of a housing having a supply port for high-pressure fluid, a controlled port for reduced pressure fluid and a vent port; a pressure-responsive throttling valve controlling communication between the supply and controlled ports, balanced so as to be substantially indifferent to supply pressure and including motor abutment means upon which controlled port pressure reacts in a valve closing direction; a relief valve controlling communication between the controlled port and the vent port and including motor abutment means of smaller effective area than the first named motor abutment means and upon which controlled port pressure reacts in a valve-opening direction; and single elastic means biasing both said motor abutment means, the first in its valve-opening and the second in its valve closing direction.

4. The structure defined in claim 3 in which the effective areas of the motor abutments are nearly equal, so that the relief valve will open in response to a slight overcharge in the controlled port but will not interfere with normal functioning of the throttling valve.

5. The structure defined in claim 3 in which a portion of the path from the controlled port to the relief valve leads through the first motor abutment means to the relief valve seat, and the single elastic means forces the second motor abutment means against the relief valve seat to function as a valve and close against said seat and so biases both motor-abutment means in the same direction, urging the first valve open, and the second closed.

6. The structure defined in claim 3 in which the motor abutment means for the throttling valve and the motor abutment means for the relief valve are plungers arranged end-to-end in a single bore, a portion of the relief path from the controlled port leads through that plunger which actuates the throttling valve to a valve seat on the end of that plunger which seat is controlled by a valve element of predetermined effective area formed on the other plunger, and the single elastic means reacts on said other plunger in a direction to force it against the throttling valve plunger to close the relief path and load both plungers.

References Cited in the file of this patent

UNITED STATES PATENTS

| Number | Name | Date |
|---|---|---|
| 404,504 | Ross | June 4, 1889 |
| 1,173,633 | Anderson | Feb. 29, 1916 |
| 1,579,940 | Iversen | Apr. 6, 1926 |
| 1,593,648 | Berger | July 27, 1926 |
| 1,725,539 | Riley | Aug. 20, 1929 |
| 1,821,189 | Meinken et al. | Sept. 1, 1931 |
| 2,375,411 | Grant | May 8, 1945 |
| 2,493,111 | Courtot | Jan. 3, 1950 |